Patented Aug. 23, 1932

1,873,345

UNITED STATES PATENT OFFICE

ARNOLD SHEPHERDSON, OF BLACKLEY, MANCHESTER, ENGLAND, ASSIGNOR TO BRITISH DYESTUFFS CORPORATION LIMITED, OF MANCHESTER, ENGLAND

MANUFACTURE OF ANTHRAQUINONE DERIVATIVES

No Drawing. Application filed February 7, 1929, Serial No. 338,326, and in Great Britain February 15, 1928.

In my copending application, Serial No. 155,550, I have described a method for the preparation of condensation products from halogen derivatives of anthraquinone with arylamines by condensing in presence of sodium acetate crystals or sodium acetate and water, in which only 1 part of arylamine is used with 1 part of halogenated anthraquinone, the sodium acetate crystals providing the diluent in place of the excess arylamine ordinarily used.

The sodium acetate solution used in my acknowledged copending application does not mix with the halogenated anthraquinone and the arylamine to form a homogeneous solution, but merely acts as a blending agent or as a suspending medium. Without the addition of the acetate solution the mixture does not permit efficient stirring while a thorough commingling of the ingredients is necessary for an efficient process and for a high yield. In the prior art either an organic solvent or a large excess of arylamine was employed to bring the reaction mixture to the desired consistency. Anhydrous alkali acetates were suggested as "acid binding agents" to neutralize the acid produced in the process.

When sulphonated anthraquinones or arylamines were employed the use of a dilute aqueous solution was possible, since the sulphonated compound was at least slightly soluble in water. The presence of water was strictly avoided when unsulphonated bodies were employed.

I have found that, in my processes, the unsulphonated bodies are advantageous and that the mixture of halogenated anthraquinone and arylamine can be brought to the desired consistency with a highly concentrated aqueous solution of the acid binding agent which I employ. No organic solvent is required and the use of excess arylamine is largely eliminated. By using the aqueous solution of acid binding agent in this manner, an economy of operation results and any excess of arylamine employed may be easily recovered.

The present invention is an improvement in or a modification of the invention claimed in application Serial No. 155,550 referred to above.

According to this invention, I have now discovered that if in place of the sodium acetate crystals or sodium acetate and water I use potassium acetate and water, I obtain consistently higher yields of the arylaminoanthraquinone. As in the prior specification I may, in addition, use condensing agents such as copper acetate, powdered copper, etc.

The following example illustrates the method of carrying out my invention, but I do not limit myself to the particular details thereof.

Example.—20 parts of bromomethylaminoanthraquinone and 12 parts of p-toluidine are suspended in a mixture of 45 parts potassium acetate, 0.5 parts of copper acetate and 10 parts of water. The whole is heated at a temperature of 110–120° C. for 16 hours, then boiled with 200 parts of dilute hydrochloric acid and filtered. The crude base is purified by dissolving it in concentrated sulphuric acid and reprecipitating the product by dilution to 63 per cent sulphuric acid. The yield of purified base is 90 per cent of the theoretical.

What I claim and desire to secure by Letters Patent is:—

1. A process for the manufacture of arylaminoanthraquinones, consisting in condensing together an unsulphonated arylamine and an unsulphonated halogenated anthraquinone in the presence of potassium acetate and water in quantities sufficient to act as a blending agent.

2. A process for the manufacture of arylaminoanthraquinones, consisting in condensing together an unsulphonated arylamine and an unsulphonated halogenated anthraquinone in the presence of copper acetate and of potassium acetate and water in quantities sufficient to act as a blending agent.

3. In the manufacture of arylaminoanthraquinones, the process which comprises condensing together an unsulphonated arylamine and an unsulphonated halogenated anthraquinone in the presence of a substantial amount of a strong aqueous solution of potassium acetate, the said strong aqueous solution serving as a blending agent, and treating the reaction mixture thus obtained with hydrochloric acid and recovering the said arylaminoanthraquinone.

4. In the manufacture of arylaminoanthraquinones, the process which comprises condensing together an unsulphonated arylamine and an unsulphonated halogenated anthraquinone in the presence of a substantial amount of a strong aqueous solution of potassium acetate, the said strong aqueous solution serving as a blending agent, treating the reaction mixture thus obtained with hydrochloric acid, filtering to recover the crude arylaminoanthraquinone, purifying the arylaminoanthraquinone by dissolving in concentrated sulfuric acid, reprecipitating by diluting the same with water and washing the arylaminoanthraquinone free from acid.

5. A process for the manufacture of arylaminoanthraquinones, consisting in condensing together p-toluidine and an unsulphonated halogenated anthraquinone in the presence of a condensing agent and of potassium acetate and water in quantities sufficient to act as a blending agent.

6. A process for the manufacture of arylaminoanthraquinones, consisting in condensing together p-toluidine and an unsulphonated halogenated anthraquinone in the presence of copper acetate and of potassium acetate and water in quantities sufficient to act as a blending agent.

7. In the manufacture of p-toluidomethylaminoanthraquinones, the process which comprises condensing together p-toluidine with bromomethylaminoanthraquinone in the presence of a strong aqueous solution of potassium acetate, the said strong aqueous solution serving as a blending agent.

8. The process of claim 7 in which copper acetate is present during the condensation reaction.

In testimony whereof I affix my signature.

ARNOLD SHEPHERDSON.